(12) United States Patent
Picard et al.

(10) Patent No.: US 12,270,606 B2
(45) Date of Patent: Apr. 8, 2025

(54) METHOD FOR MONITORING THE WEAR OF A REFRACTORY LINING OF A BLAST FURNACE

(71) Applicant: ArcelorMittal, Luxembourg (LU)

(72) Inventors: Michel Picard, Maiziéres-lés-Metz (FR); Sami-Alex Zaimi, Cracow (PL); Dianbing Huang, East Chicago, IN (US); Mouna Abbana Bennani, Istres (FR)

(73) Assignee: ArcelorMittal, Luxembourg (LU)

( * ) Notice: Subject to any disclaimer, the term of this patent is extended or adjusted under 35 U.S.C. 154(b) by 736 days.

(21) Appl. No.: 17/284,859

(22) PCT Filed: Oct. 22, 2018

(86) PCT No.: PCT/IB2018/058187
§ 371 (c)(1),
(2) Date: Apr. 13, 2021

(87) PCT Pub. No.: WO2020/084325
PCT Pub. Date: Apr. 30, 2020

(65) Prior Publication Data
US 2022/0120499 A1   Apr. 21, 2022

(51) Int. Cl.
*F27D 21/00*   (2006.01)
*F27B 1/28*   (2006.01)
*F27D 1/00*   (2006.01)
*F27D 21/04*   (2006.01)
*C21B 7/06*   (2006.01)

(52) U.S. Cl.
CPC ............ *F27D 21/0021* (2013.01); *F27B 1/28* (2013.01); *F27D 1/0006* (2013.01); *F27D 21/04* (2013.01); *C21B 7/06* (2013.01)

(58) Field of Classification Search
CPC .... F27D 21/0021; F27D 1/0006; F27D 21/04; F27B 1/28; C21B 7/06
See application file for complete search history.

(56) References Cited

U.S. PATENT DOCUMENTS 4,253,646 A * 3/1981 Goto ........................ C21B 7/06
266/271
5,944,421 A   8/1999 Groth et al.
(Continued)

FOREIGN PATENT DOCUMENTS

| CA | 2296516 | 4/1999 |
|---|---|---|
| CN | 105463142 A | 4/2016 |

(Continued)

OTHER PUBLICATIONS

W.T. Cheng, E.N. Huang, M.H. Chuo, S.W. Du, Transient natural convective heat transfer in porous medium with solidification of binary mixture, International Communications in Heat and Mass Transfer, vol. 39, Issue 8, (Year: 2012).*
(Continued)

*Primary Examiner* — Alison L Hindenlang
*Assistant Examiner* — Erica Hartsell Funk
(74) *Attorney, Agent, or Firm* — Davidson Kappel LLC

(57) ABSTRACT

A method for monitoring the wear of a refractory lining of a blast furnace using modelling of a part of the blast furnace and thermal field calculation. Computer program allowing to perform such a method.

15 Claims, 3 Drawing Sheets

(56) References Cited

U.S. PATENT DOCUMENTS

| | | |
|---|---|---|
| 7,174,787 B2 | 2/2007 | Sadri et al. |
| 7,665,362 B2 | 2/2010 | Sadri et al. |

FOREIGN PATENT DOCUMENTS

| | | | |
|---|---|---|---|
| CN | 108090293 A | | 5/2018 |
| JP | H06136420 A | | 5/1994 |
| JP | 3347462 B2 | | 11/2002 |
| WO | WO2006089414 A1 | | 8/2006 |
| WO | WO 2014/030118 A2 | | 2/2014 |

OTHER PUBLICATIONS

See Search Report of PCT/IB2018/058187 dated Apr. 4, 2019.

Chomyn et al.: "Blast Furnace Hearth Assessment by Combining AU-E and Thermocouple Data", ECIC 2016, 7$^{th}$ European Coke and ironmaking Congress, Sep. 12, 2016-Sep. 14, 2016.

Chomyn et al.: "Blast Furnace Thermal Assessment and Identification of Wear Zones," AISTech 2017 Proceedings, May 8 to 11, 2017.

Chomyn et al.: "Refractory Condition Assessment in Blast Furnace Hearth by Utilizing NDT, Thermocouple and Cooling System Data," UNITECR 2017, downloaded on Apr. 9, 2021 from http://www.unitecr2017.mundodecongresos.com/abstracts/Paper_rbxhbhfxcsxxphjpofsam.pdf.

Ghorbani et al.: "Thermal Assessment and Identification of Wear Zones in Blast Furnace Tapholes." Furnace Tapping 2018 Conference, Southern African Institute of Mining and Metallurgy, Kruger National Park, Oct. 14-17, 2018.

Hung et al.: "Predictions of Blast Furnace Hearth Corner Erosion Profile," Iron & Steel Technology, Mar. 2009, AISTech 2009, May 4 to 7, 2009.

Silva Magnago et al.: "Comparison of Methods for Solving Inverse Problems to Estimate the Wear Line in a Blast Furnace Hearth", 10 th World Conference on Computational Mechanics 2012, Jul. 2012.

\* cited by examiner

METHOD FOR MONITORING THE WEAR OF A REFRACTORY LINING OF A BLAST FURNACE

The invention is related to a method for monitoring the wear of a refractory lining of a blast furnace and to a computer program including software instructions allowing to perform such a method.

BACKGROUND

A blast furnace is an equipment used to produce hot metal and notably pig iron. It is usually constituted of a metal outer shell and of a refractory bricks lining on its internal part. This refractory lining constitutes a protection barrier for the outer metal shell by preventing hot metal to reach and damage it. Such a refractory lining may be for example initially 1 meter thick. However, this refractory lining is highly subjected to wear. This wear may be induced by several factors, one of the main wear mechanism being the carbon dissolution. Hot metal penetrates within the pores of the refractory and dissolves carbon fine particles and binder. Larger grains thus dissociate and hot metal progresses into the depth of the refractory, dissolving more and more carbon and reducing the remaining refractory thickness. If all the refractory lining is worn, the hot metal gets in contact with the outer metal shell and may pierce the structure, leading to hot metal leaks and fatal accidents. It is so of primary importance to monitor the remaining thickness of refractory lining to prevent such issues and performing necessary repair and maintenance before they happen. This is especially true for the hearth of the blast furnace which is the most limiting factor in blast furnace's life. Indeed, this part cannot be easily changed without blowing down the blast furnace which implies a long stoppage.

Document CA 2,296,516 describes a method to monitor such refractory lining wear. In this method a two-dimensional heat transfer model is calculated based on average and campaign maximum temperatures measured by group of temperature probes embedded at spaced locations across the thickness of the lining. This two-dimensional heat transfer program then iterates until a final boundary of the solidification isotherm is determined by minimizing the difference between the measured and predicted temperature at each measuring point. In this method the number of iteration must be limited to keep a reasonable calculation time, which reduces the accuracy of the determination of the wear profile.

Document WO 2014/030118 describes another method to monitor such refractory lining wear. In this method instead of starting with thermal properties to deduce a temperature field, the thermal properties are iteratively searched to provide a matching temperature field. As for the previous method, the issue lies in the iteration step which can take quite a long calculation time and so impact the accuracy.

SUMMARY OF THE INVENTION

The present invention allows a method to monitor the wear of a blast furnace refractory lining with high accuracy.

The present invention provides a method comprising the following steps:
a—Modelling in at least two dimensions at least a part of the blast furnace at an initial known state,
b—Defining the internal and external thermal boundary conditions of the modelized part,
c—Calculating the thermal field within said modelized part of the blast furnace considering the refractory lining thermal characteristics and internal and external thermal boundary conditions, said thermal field comprising temperature field and heat path lines, starting point of each path line being a measurement point and end being the internal boundary,
d—Measuring the temperature $T_{meas\_n}$ at each measurement point,
e—Based on the thermal field calculation:
  e1—Using the measured temperature $T_{meas\_n}$ at each measurement point as starting value, moving a control point along each heat path line and determining a position where said control point reaches a critical temperature $T_{crit}$,
  e2—Determining the position of the hot metal solidification isotherm, said isotherm being the curve linking all previously determined positions at which the critical temperature $T_{crit}$ is reached,
f—Calculating a new thermal field using the previously determined position of the hot metal solidification isotherm as new internal thermal boundary conditions
g—Estimating the temperature $T_{est\_n}$ at each measurement point using the newly calculated thermal field,
h—Calculating a convergence criterion CC between each estimated temperatures $T_{est\_n}$ and respective measured temperatures $T_{meas\_n}$:
  if this convergence criterion CC is below a predefined target Δ determining a wear surface of the refractory lining based on the position of the hot metal solidification isotherm,
  if this convergence criterion CC is above the predefined target Δ iterating steps e to h until the convergence criterion CC is below the predefined target Δ.

The method of the invention may also comprise the following optional characteristics considered separately or according to all possible technical combinations:
said convergence criterion CC is the minimum square root method,
in the modelling step only the hearth of the blast furnace is modelized,
only a vertical slice of the hearth is modelized, said vertical slice comprising a pad with a width W, a wall having a height H and a corner making the junction between the pad and the wall,
the method is performed for at least six vertical slices around hearth periphery,
for each slice, at least four measurement points are defined at different heights within the wall, at least three measurements points are defined along the width within the pad and at least two measurement points are defined within the corner,
thermal sensors are embedded at least per two at the same height of the wall or width of the pad, but each of the two being embedded at a different depth within the refractory lining, each group of thermal sensors forming a measurement point,
the refractory lining thermal characteristics at a measurement point are calculated using the temperature measured by the thermal sensors at different depth,
the critical temperature $T_{crit}$ is 1150° C.
if, after a predefined number of iterations, the convergence criterion CC is still above the target Δ, a refining step is performed wherein the difference between the temperature measured by the thermal sensor and the temperature estimated at the measurement point is further minimized using a bisection method, the predefined number of iterations is lower or equal to five, the blast furnace comprises a cooling system and the external boundary conditions of the thermal field calculation step is defined considering the thermal impact of such a cooling system.

The invention is also related to a computer program, including software instructions which, when executed by a processor, implement a method according to anyone of the previous embodiments.

BRIEF DESCRIPTION OF THE DRAWINGS

Other characteristics and advantages of the invention will emerge clearly from the description of it that is given below by way of an indication and which is in no way restrictive, with reference to the appended figures in which.

DETAILED DESCRIPTION

Figure 1:
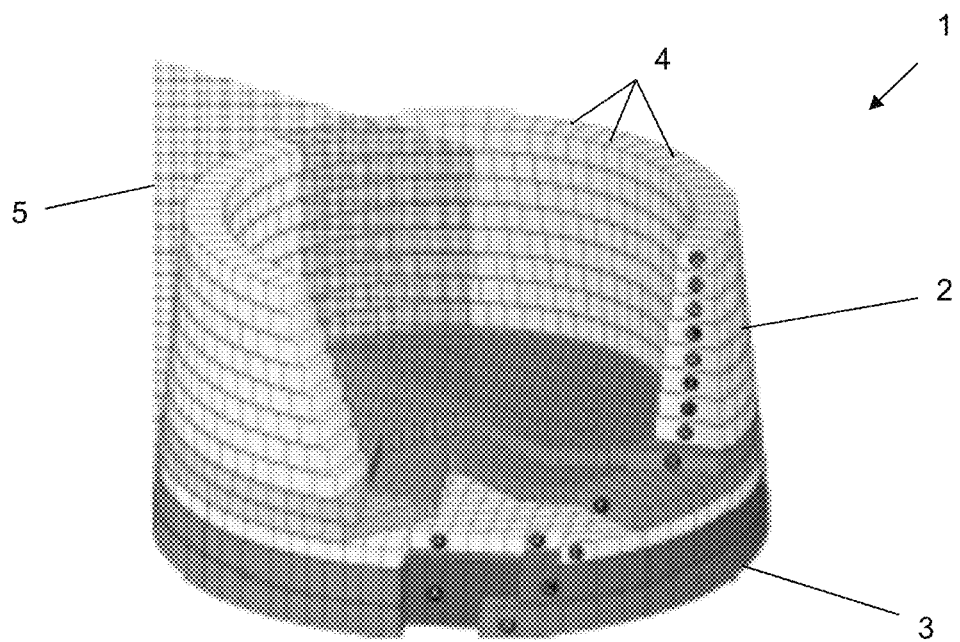
FIG. 1 illustrates the refractory lining of the hearth of a blast furnace

FIG. 1 illustrates the refractory lining of a hearth 1 of a blast furnace. The hearth 1 is the bottom part of the blast furnace. It comprises a circular wall 2, a pad 3 and a corner 4 making the junction between the wall 2 and the pad 3. The outer shell, not represented, comes around this refractory lining as an external protective layer. This hearth 1 is equipped with thermal sensors. These thermal sensors are embedded within the refractory lining. In a preferred embodiment, a slice 5 is equipped with several sensors as for example illustrated in FIG. 2.

Figure 2:
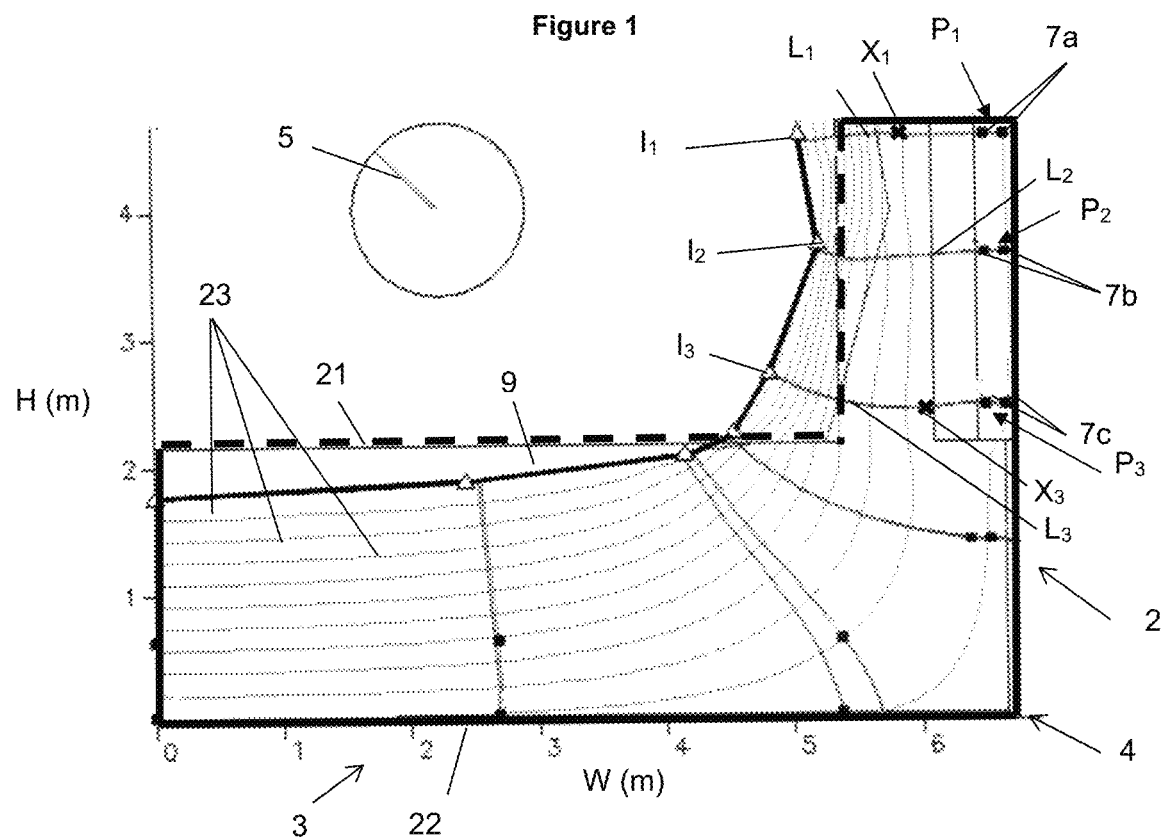
FIG. 2 illustrates an example of modeling as resulting from an embodiment of a method according to the invention

As illustrated in FIG. 2, a slice 5 of the hearth of the blast furnace is constituted of a wall 2 having a height H, a pad 3 having a width W and a corner 4 making the junction between the wall and the pad. Several sensors (7a, 7b . . . ) are embedded within the wall at different positions along the height H. Sensors within the wall are preferably located at at least four different heights. In preferred embodiment sensors are embedded at least per two for a given height; but at a different depth within the refractory lining. Several sensors (7a, 7b . . . ) are also embedded into the pad at different locations over the width W.

Sensors within the pad are preferably located at at least 3 different widths. In preferred embodiment sensors are embedded at least per two for a given width; but at a different depth within the refractory lining. The corner 4 may also comprised at least one thermal sensor (7a, 7b . . . ). Each thermal sensor or group of thermal sensors represents a measurement point $P_1$, $P_2$ . . . for the method according to the invention. When a group of sensors is considered, only one measurement point $P_n$ is defined, usually the barycenter of the group. The fact that in a preferred embodiment, thermal sensors are embedded per two but at different depths within the refractory linings allows first to determine the heat transfer coefficient at the outer face at the thermal sensors location as will be described later, but it is also a safety measure. Indeed, if one sensor is not responding anymore there is still a second one remaining and it allows to give an alert while keep running the method according to the invention. These thermal sensors are preferably thermocouples.

Figure 3:
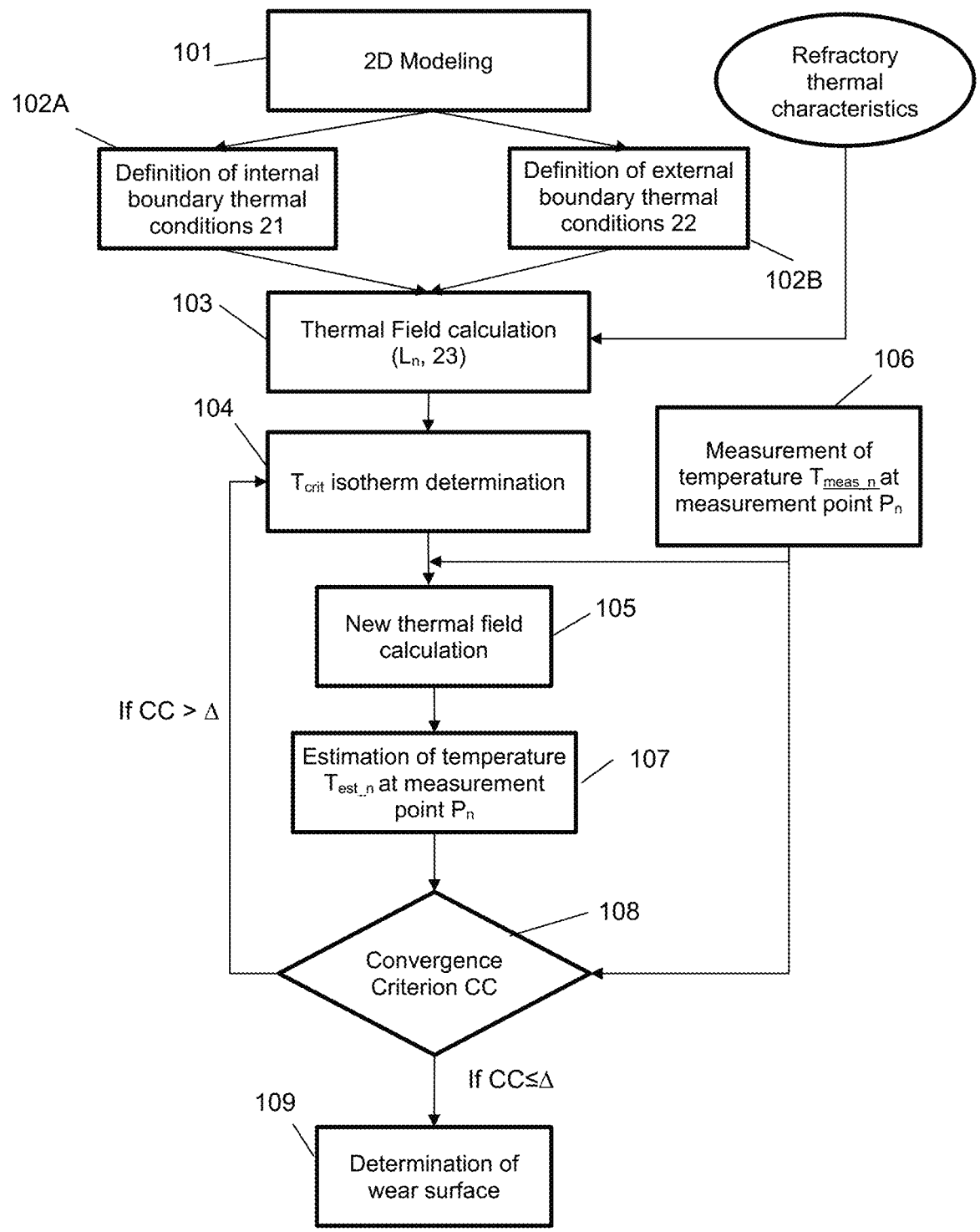
FIG. 3 illustrates the different steps of a method according to the invention

FIG. 3 schematically represents the different steps of a method according to an embodiment of the invention. In a first step 101, at least a part of the blast furnace at a known state is modelized in at least two dimensions using for example the finite element (FE) method. The mesh may be composed of rectangular cells which are not necessarily uniform. By known state it is meant a state where the thickness of the refractory can be actually known, through direct measurement for example. This known state may be when the blast furnace is erected, after its revamping or after a repairing campaign. In a preferred embodiment only a slice 5, as illustrated in FIG. 1, of the hearth of the blast furnace is modelized. The method according to the invention can then be performed for several slices, preferably six uniformly distributed around the hearth periphery, to have a global view of the state of wear of the hearth lining. This modeling considers the refractories repartition.

In a second step 102, thermal boundary conditions are defined. It comprises the definition (102A, 102B) of the internal thermal boundary 21 conditions (as represented by the dotted lines) and of the external thermal boundary 22 conditions (as represented by the bold line). The internal thermal boundary 21 is the limit over which the refractories are considered as damaged. It is also called the critical isotherm and usually corresponds to the temperature at which the hot metal solidifies. It may be 1150° C. The external thermal boundary 22 conditions correspond to the thermal conditions of the outer parts of the hearth. They take into account the combination between the heat transfer coefficients and the coldest temperature which usually corresponds for the wall to the temperature of the cooling medium used to cool the outer shell of the blast furnace. Indeed, the blast furnace may be equipped with a cooling system which helps cooling the refractories, in that case the external thermal boundary condition should take into account this cooling and notably the temperature of the cooling fluid. Those thermal boundary conditions are combined with the thermal characteristics of the refractories, such as the thermal conductivity or the heat transfer coefficient, to calculate the thermal field within the considered part of the blast furnace in a third step 103. This thermal field comprises temperature field 23 and heat path lines $L_n$. Those heat path lines $L_n$ represent the paths followed by the heat during its transfer from a hot part to a coldest one. Each path line $L_n$ has for starting point a measurement point $P_n$ and as end a point $I_n$ where the temperature reaches the internal boundary (21). Thermal conductivity of the refractories may be the value provided by the refractory maker but can also be calculated in a dedicated lab. In a preferred embodiment wherein, thermal sensors are embedded at least by pair at different depths within the lining, there is at least two temperature measurements. Calculating the difference between those two temperatures and knowing the position of the sensors, it is then possible to estimate the heat transfer coefficient in the refractory area where said thermal sensors are embedded. Calculating a thermal field is something known by the man skilled in the art. One calculation method is described below as a matter of example.

Figure 4:
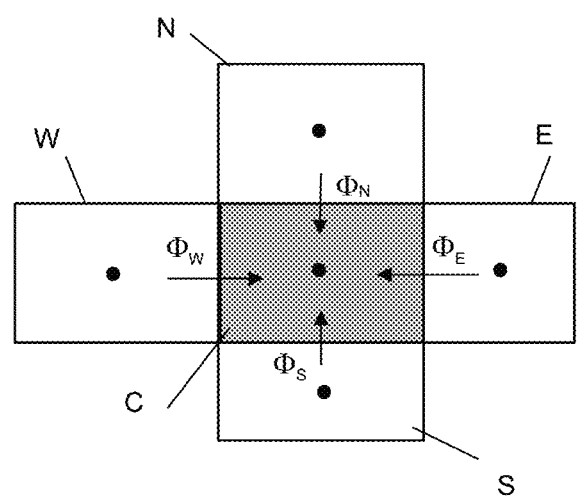
FIG. 4 represents some of the parameters used in an embodiment of a method according to the invention Elements in the figures are illustration and may not have been drawn to scale.

Fourier's law and heat equations in a two dimensions plane may for example be used as described below and in reference to FIG. 4.

$$\text{grad } \vec{\Phi} = 0 \tag{1}$$

$$\vec{\Phi} = -\lambda_t \overrightarrow{\text{grad}}(T) \tag{2}$$

Wherein $\Phi$ is the heat flux, $\lambda_t$ is the thermal conductivity of the considered medium and T is the temperature.
Which gives, using cylindrical coordinates:

$$\frac{1}{r} \cdot \frac{\partial\left(r \cdot \lambda_r(T) \cdot \frac{\partial T}{\partial r}\right)}{\partial r} + \frac{\partial\left(\lambda_z(T) \cdot \frac{\partial T}{\partial z}\right)}{\partial z} = 0 \tag{3}$$

Where r is the coordinate along the direction X which corresponds to the direction along the radii R of the pad 3 and z is the coordinate along the direction Z which correspond to the direction along the height H of the wall 2. $\lambda_r(T)$ is the thermal conductivity of the refractory at the coordinate r and is dependent of the temperature T at said coordinate. $\lambda_z(T)$ is the thermal conductivity of the refractory at the coordinate z and is dependent of the temperature T at said coordinate. Applied to a rectangular grid as illustrated in FIG. 4, the energy balance may be interpreted as: the sum of heat fluxes on all four sides of a cell is equal to zero.
Knowing that a local heat flux is proportional to the temperature difference between two neighbor cells:

$$\Phi_i = S_i R_i \cdot (T_i T_C)$$

Where C is a given cell, i is one of the neighbor cell of cell C, $\Phi$ is the local heat flux between cell C and its neighbor i, S and R are, respectively, the area and the resistance between two successive cells i and C and T is the temperature of the considered cell. The heat balance on the cell C can be so written as:

$$(S_N R_N + S_S R_S + S_W R_W + S_E R_E) \cdot T_C - (S_N R_N T_N + S_S R_S T_S + S_E R_E T_E + S_W R_W T_W) = 0$$

Where E, S, W, N are the four neighboring cells of cell C. All these equations constitute a linear system of i equations with i unknowns, i being the number of cells of the grid, system to be solved to calculate the thermal field.

Using this calculated thermal field, it is possible to determine the position of the critical isotherm 9. As previously explained this critical isotherm represents the line above which the refractory is considered as damaged. This critical isotherm is defined by the position at which the temperature is equal to the critical temperature $T_{crit}$ at which hot metal solidifies. To determine this critical isotherm, it is first necessary to measure 104 the actual temperature $T_{meas\_n}$ at each measurement point $P_n$. Then for each measurement point $P_n$, a control point $X_n$ is moved along the respective heat path line $L_n$, its initial temperature at measurement point $P_n$ is the measured temperature $T_{mes\_n}$ at said measurement point $P_n$, its temperature then increases along the heat path line $L_n$ and when it reaches the critical temperature $T_{crit}$, its movement is stopped and critical isotherm point $I_n$ is positioned. Doing so for each measurement point $P_n$ a set of critical isotherm points are positioned and by linking those points it is possible to determine 105 the position of the critical isotherm 9.

The position of this critical isotherm 9 is then used as internal thermal boundary 21 conditions to calculate 106 a new thermal field. Based on this new calculated thermal field the temperature $T_{est\_n}$ at measurement point $P_n$ is estimated 107.

Estimated temperatures $T_{est\_n}$ are then compared with temperatures $T_{mes\_n}$ actually measured in step 104 by the thermal sensors at each measurement point $P_n$. Differences between those temperatures allows to calculate 108 a convergence criterion CC. In a preferred embodiment, the convergence criterion CC is minimum root square. It may be expressed as:

$$CC = \sqrt{\sum_{n=1}^{N}\left(\frac{(T_{mes_n} - T_{est_n})^2}{N}\right)}$$

Where N is the number of measurement points $P_n$.

In order to have the more accurate estimation of the critical isotherm it is important that the estimated temperatures $T_{est\_n}$ are the closest as possible to the actually measured temperatures $T_{mes\_n}$. So, if the convergence criterion CC is above a predefined target $\Delta$, it is necessary to reduce it. To do so, starting from each measurement point $P_n$ and considering that the temperature at this point is the measured one $T_{meas\_n}$, the control point $X_n$ is moved along its respective heat path line $L_n$ and its temperature is recalculated until it reaches the temperature $T_{crit}$ of the critical isotherm and define a new critical isotherm position $I_n$. Doing so for each measurement point $P_n$ allows to determine a new position of the critical isotherm 9. This new critical isotherm is then used as new internal boundary conditions in step 102A and allows to calculate a new thermal field in step 103, preferably using same external boundary conditions and same refractories thermal characteristics. From this new thermal field calculation, a new temperature $T_{est\_n}$ at measurement point $P_n$ is estimated and compared with the actual temperature measured $T_{mes\_n}$ by thermal probes at said measurement point $P_n$. This cycle can be performed as long as the convergence criteria CC is above the predefined target $\Delta$ or only a given number of times if a predefined number has been set for time calculation purpose. This predefined number may be lower or equal to five.

The inventors have discovered that by moving the control point $X_n$ along the heat path lines they get a better sensitivity and reduce more quickly the gap between the estimated and the measured temperature. This allow less iteration and is so faster to reach low convergence criterion and more accurate method compared to prior art.

In a further embodiment it is possible to still refine the position of the critical isotherm by further minimizing the difference between the estimated and the measured temperature $T_{mes\_n}$ at measurement point $P_n$. In the previous iteration all the control points $X_n$ were moved along their dedicated path line $L_n$ before defining the new position of the critical isotherm 9. When this method doesn't allow to further minimize the difference it is then possible to work control point by control point. For example, estimated temperature $T_{est\_1}$ is compared with measured temperature $T_{mes\_1}$ at measurement point $P_1$, if the difference is above a given threshold, the control point Xi is moved along its heat path line $L_1$ or towards scaffolding and a new position $I_1$ at which of the critical temperature $T_{crit}$ is reached, is determined. Then the thermal field in this domain is recalculated using this new position as internal boundary condition, a new position of the critical temperature is determined and a new temperature $T_1$ is estimated. The cycle is repeated until the difference is below a given threshold. The same method is then applied for each control point $X_n$ and a new critical isotherm position can be accurately drawn. In a preferred embodiment a bisection method is used as refining method.

If or once the convergence criterion is below the predefined target Δ, the position of the critical isotherm is accurately estimated and it is then possible to estimate 109 the wear line of the refractory lining. In front of the critical isotherm the refractory is considered as damaged while behind this isotherm is it considered as safe. Repairing actions such as guniting may be planned to extend the life duration of the hearth of the blast furnace.

All these steps, excluding the temperature measurement 104, may be translated into a series of software instructions and the method can be performed by a computer program including said software instructions.

FIG. 2 illustrate results which may be obtained by performing a method according to the invention. In this embodiment, only a slice 5 of the hearth of the blast furnace is modeled. Four pairs of thermocouples are embedded in the wall 2 of the hearth of the blast furnace and two pairs in the corner. Heat path lines ($L_1, L_2 \ldots$) run from the location of those thermocouples to the position ($I_1, I_2 \ldots$) at which the critical temperature $T_{crit}$ is reached. In this case critical temperature is of 1150° C. The 1150° C. isotherm 9 is then drawn (in bold line with triangles) and represents the limit above which the refractories are worn and do not fulfill their protection role anymore. As may be seen on this result, the critical isotherm is partly beyond the initial internal boundary, this means that there is scaffolding. Scaffolding is accretions or scabs build up on the furnace walls. It causes a decrease in the cross-sectional area of the stack of the blast furnace which is detrimental to productivity.

With a method according to the invention it is possible to accurately determine the state of wear of a blast furnace.

What is claimed is:

1. A method for monitoring the wear of a refractory lining of a blast furnace, the method comprising, using a computer:
   a. modelling in at least two dimensions at least a part of the blast furnace at an initial known state;
   b. defining internal thermal boundary conditions and external thermal boundary conditions of the modelized part of step (a);
   c. calculating a thermal field within said modelized part of the blast furnace considering refractory lining thermal characteristics and the internal and external thermal boundary conditions, said thermal field including a temperature field and heat path lines (Ln), a starting point of each path line (Ln) being a measurement point (Pn) and an end point being the internal boundary;
   d. measuring, by thermal sensors, a temperature ($T_{meas\_n}$) at each measurement point (Pn), the thermal sensors being embedded at least per two at the same height of the wall or width of the pad, but each of the two being embedded at a different depth within the refractory lining, each group of thermal sensors forming one of the measurement points (Pn);
   e. based on the thermal field calculation of step (c):
      e1—using the measured temperature ($T_{meas\_n}$) at each measurement point (Pn) as a starting value, moving a control point (Xn) along each heat path line (Ln) and determining a position (In) where said control point (Xn) reaches a critical temperature $T_{crit}$,
      e2—determining a position of the hot metal solidification isotherm, said isotherm being a curve linking all previously determined positions (In) at which the critical temperature $T_{crit}$ is reached;
   f. calculating a new thermal field using the previously determined position of the hot metal solidification isotherm as new internal thermal boundary conditions;
   g. estimating a temperature $T_{est\_n}$ at each measurement point (Pn) using the newly calculated thermal field;
   h. calculating a convergence criterion CC between each estimated temperature $T_{est\_n}$ and respective measured temperature $T_{meas\_n}$;
   if this convergence criterion CC is below a predefined target Δ, determining a wear surface of the refractory lining based on the position of the hot metal solidification isotherm,
   if this convergence criterion CC is above the predefined target Δ, iterating steps e to h until the convergence criterion CC is below the predefined target Δ; and
   i. outputting the wear surface of the refractory lining determined based on the position of the hot metal solidification isotherm to identify a portion of the refractory lining as being a damaged portion based on the position of the hot metal solidification isotherm.

2. The method according to claim 1 wherein said convergence criterion CC is a minimum square root method.

3. The method according to claim 1, wherein in the modelling step only a hearth of the blast furnace is modelized.

4. The method according to claim 3 wherein only a vertical slice of the hearth is modelized, said vertical slice comprising a pad with a width W, a wall having a height H and a corner making a junction between the pad and the wall.

5. The method according to claim 4 wherein the method is performed for at least six vertical slices around hearth periphery.

6. The method according to claim 4 wherein for each slice, at least four measurement points Pn are defined at different heights within the wall, at least three measurements points Pn are defined along the width within the pad and at least two measurement points Pn are defined within the corner.

7. The method according to claim 1 wherein the refractory lining thermal characteristics at said one of the measurement points (Pn) are calculated using the temperature measured by the thermal sensors at different depth.

8. The method according to claim 1, wherein the critical temperature $T_{crit}$ is 1150° C.

9. The method according to claim 1, wherein if, after a predefined number of iterations, the convergence criterion CC is still above the target Δ, a refining step is performed wherein the difference between the temperature measured by the thermal sensor and the temperature estimated at the measurement point is further minimized using a bisection method.

10. The method according to claim 9 wherein the predefined number of iterations is lower or equal to 5.

11. The Method according to claim 1, wherein the blast furnace comprises a cooling system and the external boundary conditions of the thermal field calculation step is defined considering the thermal impact of such a cooling system.

12. Non-transitory computer readable media, having stored thereon, computer executable process steps operative to control a computer to perform the steps of claim 1.

13. A method of maintaining a blast furnace comprising:
   performing the method for monitoring the wear of the refractory lining of the blast furnace as recited in claim 1; and
   repairing the damaged portion.

14. The method as recited in claim 13 wherein the damaged portion is a portion of the refractory lining in front of the position of the hot metal solidification isotherm.

15. The method as recited in claim 13 wherein the repairing of the damaged portion includes performing guniting.

* * * * *